(12) United States Patent
Yasuda et al.

(10) Patent No.: US 7,797,935 B2
(45) Date of Patent: Sep. 21, 2010

(54) HYDRAULIC DRIVE DEVICE FOR DUMP TRUCK

(75) Inventors: Tomohiko Yasuda, Tsuchiura (JP); Takashi Yagyu, Tsuchiura (JP); Yasuo Tanaka, Tsuchiura (JP); Michio Fushiki, Tsuchiura (JP); Satoru Kaneko, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 385 days.

(21) Appl. No.: 12/064,940

(22) PCT Filed: Aug. 22, 2006

(86) PCT No.: PCT/JP2006/316403

§ 371 (c)(1),
(2), (4) Date: Feb. 26, 2008

(87) PCT Pub. No.: WO2007/029486

PCT Pub. Date: Mar. 15, 2007

(65) Prior Publication Data
US 2009/0145121 A1    Jun. 11, 2009

(30) Foreign Application Priority Data
Sep. 1, 2005    (JP)    ............... 2005-253514

(51) Int. Cl.
*B60K 8/00* (2006.01)
*F15B 11/00* (2006.01)

(52) U.S. Cl. .......................................... 60/431; 60/433

(58) Field of Classification Search .................... 60/431, 60/432, 433, 434
See application file for complete search history.

(56) References Cited

U.S. PATENT DOCUMENTS 7,067,999 B2 *    6/2006   Sugano et al. ............... 318/372

FOREIGN PATENT DOCUMENTS

| EP | 1 199 411 A1 | 4/2002 |
|---|---|---|
| JP | 60071364 A * | 4/1985 |
| JP | 2001-3779 A | 1/2001 |
| JP | 2001-11888 A | 1/2001 |
| JP | 2002-323005 A | 11/2002 |
| JP | 2004-268649 A | 9/2004 |
| JP | 2005-98216 A | 4/2005 |

OTHER PUBLICATIONS

International Search Report dated Oct. 10, 2004 Including English translation (Three (3) pages).

* cited by examiner

*Primary Examiner*—Thomas E Lazo
(74) *Attorney, Agent, or Firm*—Crowell & Moring LLP

(57) ABSTRACT

A hydraulic drive system is provided with a generator 8 for outputting electricity corresponding to a rotation speed of an engine 7, an electric motor 11 drivable responsive to the electricity from the generator 8, hydraulic pumps 12a, 12b drivable by the electric motor 11, truck-body elevating cylinders 6 for pivoting a truck body 5 in an up-and-down direction, and a stroke detector 14 for detecting a stroke of the control apparatus of the truck-body elevating cylinders 6, and is also provided with a controller 19 for performing control of engine rotation speed. The controller 19 includes a motor electric-power computing means 19a for determining electric power for the electric motor 11, which corresponds to the stroke detected by the stroke detector 14, and a discrimination means 19b for discriminating whether or not the electricity from the generator 8 has become greater than the thus-determined electric power for the electric motor 1.

4 Claims, 5 Drawing Sheets

HYDRAULIC DRIVE DEVICE FOR DUMP TRUCK

TECHNICAL FIELD

This invention relates to a hydraulic drive system for a dump truck used in a mine, which is provided with an electric motor for driving a hydraulic pump such that pressure oil is delivered to actuate truck-body elevating cylinders.

BACKGROUND ART

As a conventional technology involving an electric motor for driving a hydraulic pump, one disclosed in Patent Document 1 can be mentioned. Although this conventional technology is applied to a hydraulic excavator rather than a dump truck to which the present invention is applied, it is provided with an engine, a generator for outputting electricity corresponding to a rotation speed of the engine, an electric motor to which the electricity is fed from the generator via an inverter, a hydraulic pump drivable by the electric motor, hydraulic actuators operable by pressure oil delivered from the hydraulic pump, and control valves for controlling flows of pressure oil to be fed from the hydraulic pump to the hydraulic actuators.

The engine and the generator are arranged as an integrated combination, while the electric motor and the hydraulic pump are arranged as an integrated combination. These integrated combinations are located apart from each. The conventional technology, therefore, has a merit in that the engine and the hydraulic pump are not connected directly and the hydraulic pump can hence enjoy a greater degree of freedom as to its installation position.

Patent Document 1: JP-A-2001-11888

DISCLOSURE OF THE INVENTION

Problem to Be Solved by the Invention

When one intends to apply the above-mentioned conventional technology to a dump truck to which the present invention is applied, it may be contemplated to design a construction such that the pressure oil delivered from the hydraulic pump driven by the electric motor is fed to truck-body elevating cylinders, which serve to pivot a bed-forming truck body in an up-and-down direction, to actuate the truck-body elevating cylinders.

In this construction, however, the actuation of the truck-body elevating cylinders upon operation of the truck body needs to increase the rotation speed of the engine such that the generator can be driven to assure sufficient electricity for driving the electric motor. If the rotation speed of the engine is increased too much, however, engine noise is transmitted to the environment surrounding the work site, and moreover, energy is wastefully consumed.

The present invention has been completed in view of the above-mentioned reality of the conventional technology, and has as an object thereof the provision of a hydraulic drive system for a dump truck, which can prevent an excess increase in engine rotation speed upon operation of a truck body.

Means for Solving the Problem

To achieve the above-described object, the present invention provides a hydraulic drive system for a dump truck having a truck frame and a truck body arranged pivotably in an up-and-down direction relative to said truck frame, said hydraulic drive system being to be mounted on said dump truck and being provided with an engine, a generator for outputting electricity corresponding to a rotation speed of said engine, an electric motor drivable responsive to said electricity from said generator, a hydraulic pump drivable by said electric motor, and truck-body elevating cylinders capable of being actuated by pressure oil delivered from said hydraulic pump to pivot said truck body in said up-and-down direction, comprising: a stroke detector for detecting a stroke of the control apparatus of said truck-body elevating cylinders; and a controller for controlling a rotation speed of said engine, said controller comprising a motor electric-power computing means for determining electric power for said electric motor, which corresponds to said stroke detected by said stroke detector, and a discrimination means for discriminating whether or not said electricity from said generator has become greater than said electric power for the electric motor as determined by said motor electric-power computing means.

According to the present invention constructed as described above, upon operation of the truck body, a stroke of the control apparatus of the truck-body elevating cylinders is detected by the stroke detector, its detection signal is outputted to the controller, and electric power for the electric motor, which corresponds to the stroke, is determined by the motor electric-power computing means in the controller. Further, an engine drive signal is outputted from the controller such that an engine rotation speed corresponding to the stroke of the control apparatus will be reached. The engine rotation speed, therefore, begins to increase, for example, from a state maintained at an idle speed, and as a result, electricity is outputted to the controller from the generator driven by the engine.

By the discrimination means in the controller, it is then determined whether or not the electricity from the generator has become greater than the electric power for the electric motor as determined by the motor electric-power computing means. When not discriminated to be greater by the discrimination means, the control that increases the engine rotation speed is continued, the electricity from the generator becomes greater, and as a consequence, the actual electricity fed to the electric motor gradually increases, resulting in an increase in the flow rate of pressure oil delivered from the hydraulic pump. By the pressure oil delivered from the hydraulic pump, the truck-body elevating cylinders extend to perform a body elevating operation.

When the electricity from the generator is discriminated by the discrimination means in the controller to have become greater than the electric power for the electric motor as determined by the motor electric-power computing means, a control signal is outputted from the controller to decrease the engine rotation speed. As a result, a truck-body elevating operation can be performed corresponding to the stroke of the control apparatus, and further, an excessive increase in engine rotation speed can be prevented.

The present invention is also characterized in that in the invention as described above, the combination of the engine and the generator and the combination of the electric motor and the hydraulic pump can be arranged apart from each other.

In addition, the present invention is also characterized in that the controller can comprise a means for performing processing to decreasingly control the rotation speed of the engine when the electricity from the generator is discriminated by the discrimination means to have become greater than the electric power for the motor as determined by the motor electric-power computing means.

ADVANTAGEOUS EFFECTS OF THE INVENTION

The present invention can prevent an excessive increase in engine rotation speed upon operation of a truck body, thereby making it possible to reduce engine noise to the surrounding environment and also to realize energy saving. Accordingly, the present invention can provide a high-reliability dump truck.

BEST MODE FOR CARRYING OUT THE INVENTION

The best mode for carrying out the hydraulic drive system according to the present invention for a dump truck will hereinafter be described with reference to the drawings.

FIG. 1 is a side view of one example of a dump truck on which one embodiment of the hydraulic drive system according to the present invention can be mounted, and FIG. 2 is a view taken in the direction of arrow A of FIG. 1.

As illustrated in FIG. 1, the dump truck on which the one embodiment of the hydraulic drive system according to the present invention can be mounted is provided with a truck frame 1 forming an undercarriage, a cab 2 arranged on the truck frame 1 at a forward position thereof, front wheels 3 and rear wheels 4, a truck body 5 pivotable in an up-and-down direction about a pivotal fulcrum set on a rear part of the truck frame 1, and a pair of left and right truck-body elevating cylinders 6 for pivoting the truck body 5 in the up-and-down direction. As depicted in FIG. 2, the dump truck is also provided with an engine 7 and a generator 8 driven by the engine 7.

FIG. 3 is a hydraulic circuit diagram illustrating the outline construction of the hydraulic drive system according to this embodiment, and FIG. 4 is a diagram showing a relationship between stroke of the control apparatus of truck body and pump delivery rate as stored in a controller which this embodiment is equipped with.

As shown in FIG. 3, the hydraulic drive system is also provided, in addition to the above-described truck-body elevating cylinders 6, engine 7 and generator 8, with an accelerator pedal 9 employed during running, electric traction motors 10, an electric motor 11 to which electric power is fed corresponding to electricity from the generator 8, and hydraulic pumps 12a, 12b, 12c which can be actuated by the electric motor 11.

The engine 7 and the generator 8 arranged as an integral unit, while the electric motor 11 and the hydraulic pumps 12a, 12b, 12c are arranged as an integral unit. Specifically, the combination of the engine 7 and the generator 8 and the combination of the electric motor 11 and the hydraulic pumps 12a, 12b, 12c are arranged apart from each other.

The hydraulic drive system is also provided with a truck-body elevating control valve 13 for controlling flows of pressure oil to be fed from the hydraulic pumps 12a, 12b to the truck-body elevating cylinders 6, respectively, and a control lever 13a for performing switching control of the truck-body elevating control valve 13.

The hydraulic drive system is further provided with a pair of steering cylinders 15 capable of being actuated by pressure oil delivered from the hydraulic pump 12c to change the direction of the front wheels 3 and also with a steering control valve 16 for actuating these steering cylinders 15. Also provided are front brakes 18a and rear brakes 18b drivable by pressure oil delivered from the hydraulic pump 12c to brake the front wheels 3 and the rear wheels 4, respectively, and a brake pedal 17 for controlling actuation of these front brakes 18a and rear brakes 18b.

In particular, this embodiment is provided with a stroke detector 14 for detecting a stroke of the truck-body elevating cylinders 6. In addition, a controller 19 for controlling the rotation speed of the engine 7 is equipped with a motor electric-power computing means 19a for determining electric power for the electric pump motor 11, said electric power corresponding to the stroke detected by the stroke detector 14, and also with a discrimination means 19b for discriminating whether or not electricity, which is inputted to the controller 19 from the generator 8, has become greater than the electric power for the electric motor 11 as determined by the motor electric-power computing means 19a.

A functional relationship, which represents a relationship between stroke of truck-body elevating control apparatus and pump delivery rate as illustrated by way of example in FIG. 4, is stored in the controller 19. This functional relationship indicates that the pump delivery rate increases substantially linearly with the stroke of truck-body elevating control apparatus. At the above-described motor electric-power computing means 19a, electric power for the electric motor 11, which can assure a pump delivery rate corresponding to a stroke of truck-body elevating control apparatus, is determined from the functional relationship between stroke of truck-body elevating control apparatus and pump delivery rate as illustrated in FIG. 4 and a functional relationship between pump delivery rate and electric power for the electric motor 11 stored beforehand in addition to the first-mentioned functional relationship.

About operation of this embodiment constructed as described above, a description will hereinafter be made centering around the processing at the controller 19. FIG. 5 is a flow chart illustrating essential ones of processing steps at the controller which this embodiment is equipped with.

As shown by way of example in step S1 of FIG. 5, the current engine rotation speed is assumed to be maintained at an idle speed, that is, the minimum rotation speed under control by the controller 19. Under this condition, it is discriminated as shown in step S2 whether or not a detection signal of a stroke of truck-body elevating control apparatus has been inputted from the stroke detector 14 to the controller 19. If the result of this discrimination is "NO", the engine rotation number is continuously maintained at the idle speed. When the control lever 13a is manipulated to perform a truck-body elevating operation, the result of discrimination in step S2 becomes "YES". The routine then advances to step S3 and the truck-body elevating control valve 13 is switched, and the hydraulic pumps 12a, 12b begin to feed pressure oil to the truck-body elevating cylinders 6 via the truck-body elevating control valve 13.

In step S3, a delivery rate from the hydraulic pumps 12a, 12b is determined in accordance with the functional relationship shown in FIG. 4 by the motor electric-power computing means 19a in the controller 19 on the basis of a detection signal from the stroke detector 14. Electric power for the electric motor 11, which can assure the thus-determined delivery rate of the hydraulic pumps 12a, 12b is then determined from the functional relationship between pump delivery rate and electric power for the electric motor 11 stored beforehand.

The controller 19 also begins to output a control signal, which increases the engine rotation speed from the idle speed such that the electricity from the generator 8 will reach a level that corresponds to the thus-determined electric power for the electric motor 11.

The routine then advances to step S4, where a discrimination is made by the discrimination means 19b in the controller 19 as to whether or not the electricity from the generator 8 as inputted in the controller 19 has become greater than the electric power for the electric motor 11 as determined above by the motor electric-power computing means 19a. If the result of this discrimination is "NO", the routine then moves to step S5.

In step S5, the control that increases the engine rotation speed is continued. Owing to this increase in engine rotation speed, the electricity from the generator 8 increases, leading to an increase in the actual electric power to be fed to the electric motor 11 via the controller 19. As a consequence, the delivery rate of the hydraulic pumps 12a, 12b driven by the electric motor 11 increases. By the pressure oil fed from these hydraulic pumps 12a, 12b to the truck-body elevating cylinders 6 via the truck-body elevating control valve 13, the truck-body elevating cylinders 6 are actuated to extend. As a result, the truck body 5 depicted in FIG. 1 is upwardly pivoted about the pivotal fulcrum secured on the rear part of the truck frame 1 so that dumping work of, for example, earth and sand or the like, which is loaded on the truck body 5, from the truck body 5 is effected.

If discriminated to be "YES" in the above-described step S4, on the other hand, the routine advances to step S6, where the controller 19 performs control to promptly decrease the engine rotation speed.

If the control lever 13a depicted in FIG. 3 is returned to neutral at this time, for example, the truck-body elevating control valve 13 returns to neutral, so that the truck-body elevating cylinders 6 stop in their extended positions and the truck body 6 stops in an upwardly-pivoted position. The engine rotation speed at this time becomes equal to the idle speed. In this state, the pressure oil delivered from the hydraulic pumps 12a, 12b is drained to a reservoir through the neutral position of the truck-body elevating control valve 13.

According to this embodiment, the controller 19 performs processing to decrease the engine rotation speed in the course of truck-body elevation operation when the electricity from the generator 8 driven by the engine is discriminated by the discrimination means 19b in the controller 19 to have become greater than the electric power for the electric motor 11 as determined by the motor electric-power computing means 19a, in other words, when elevating operation of the truck body 5 has been realized corresponding to a stroke of the control lever 13a. It is, therefore, possible to prevent an excessive increase in engine rotation speed upon such elevating operation of the truck-body. Accordingly, engine noise to the surrounding environment can be reduced and energy saving can be realized, thereby making it possible to provide a high-reliability dump truck.

In this embodiment, the combination of the engine 7 and the generator 8 and the combination of the electric motor 11 and the hydraulic pumps 12a, 12b, 12c are arranged apart from each so that the engine 7 and the hydraulic pumps 12a, 12b, 12c are not connected directly. Owing to this arrangement, the hydraulic pumps 12a, 12b, 12c are provided with a greater degree of freedom as to their installation position in the truck frame 1.

BRIEF DESCRIPTION OF THE DRAWINGS

[FIG. 4] A diagram showing a relationship between stroke of truck-body elevating control apparatus and pump delivery rate, which is stored in a controller which this embodiment is equipped with.
[FIG. 5] A flow chart illustrating essential ones of processing steps at the controller which this embodiment is equipped with.

LEGEND

Figure 1:
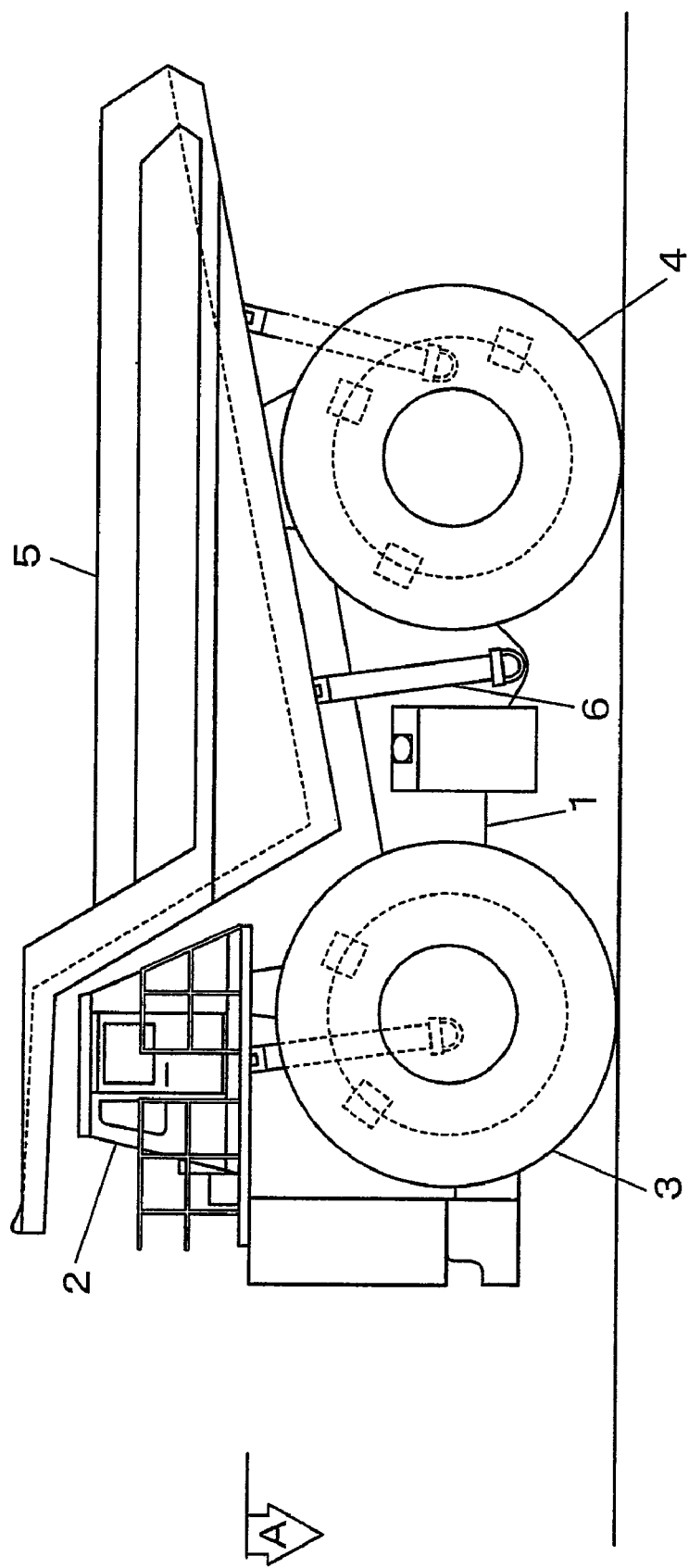
[FIG. 1] A side view illustrating one example of a dump truck on which one embodiment of the hydraulic drive system according to the present invention can be mounted.
Figure 2:
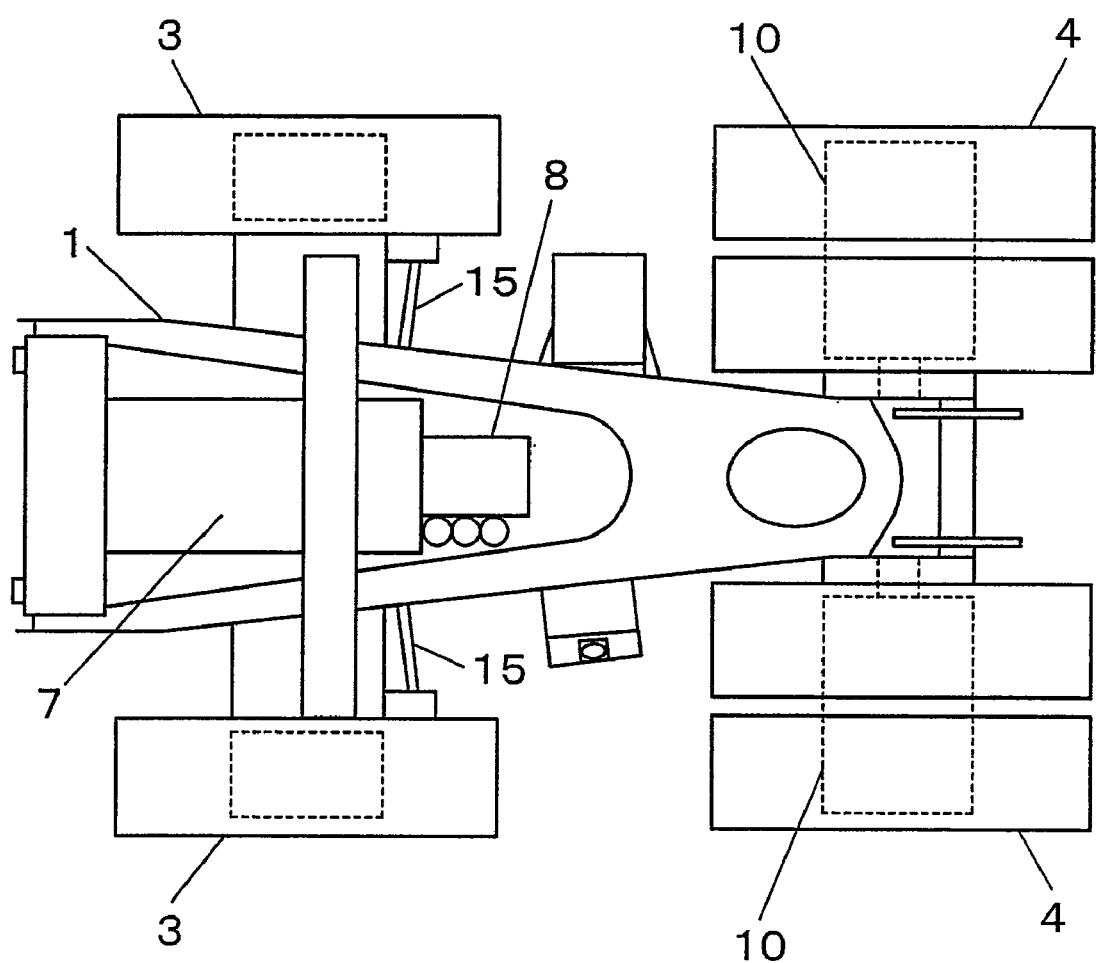
[FIG. 2] A view taken in the direction of arrow A of FIG. 1.
Figure 3:
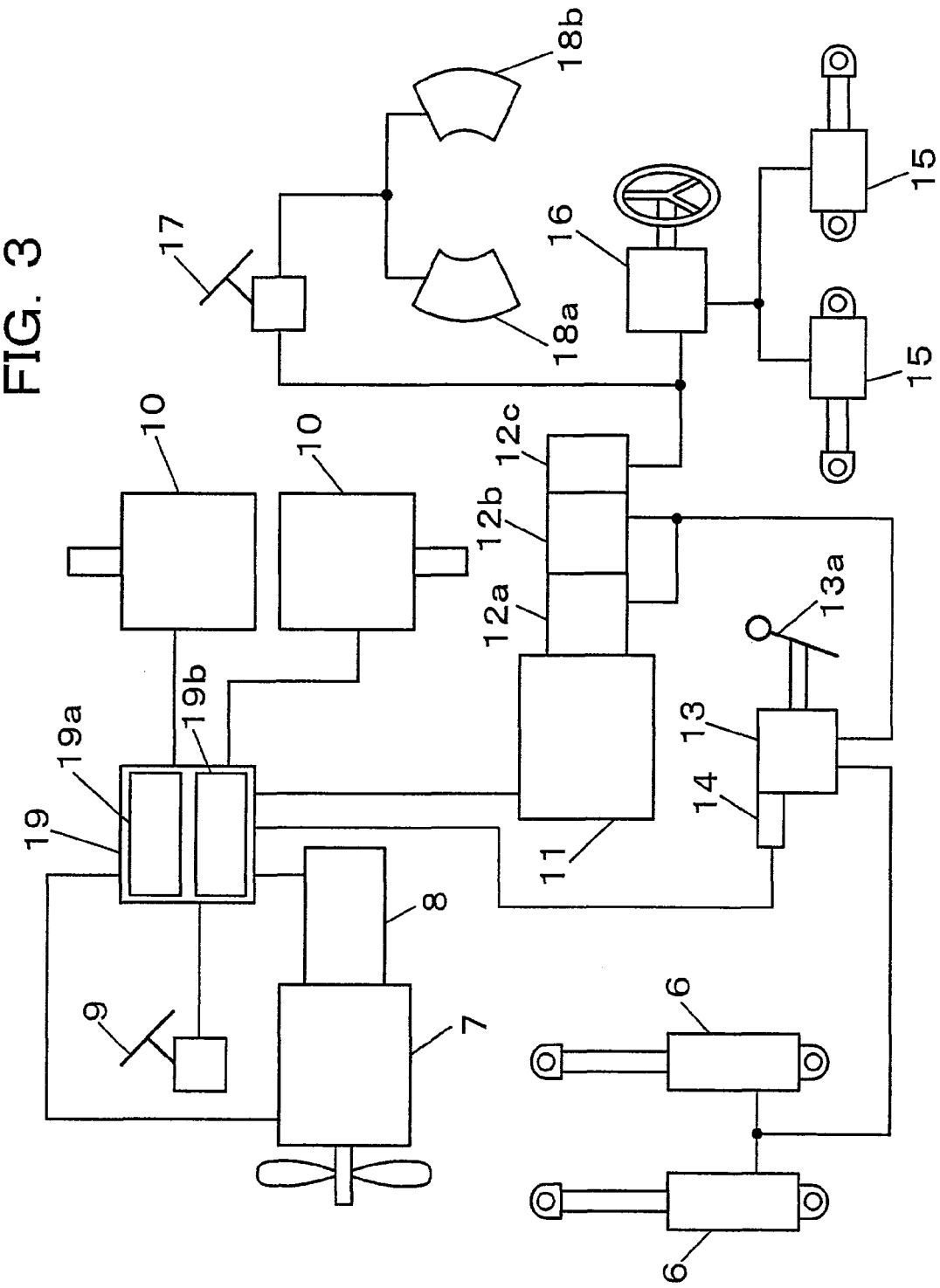
[FIG. 3] A hydraulic circuit diagram depicting the outline construction of this embodiment.
Figure 4:
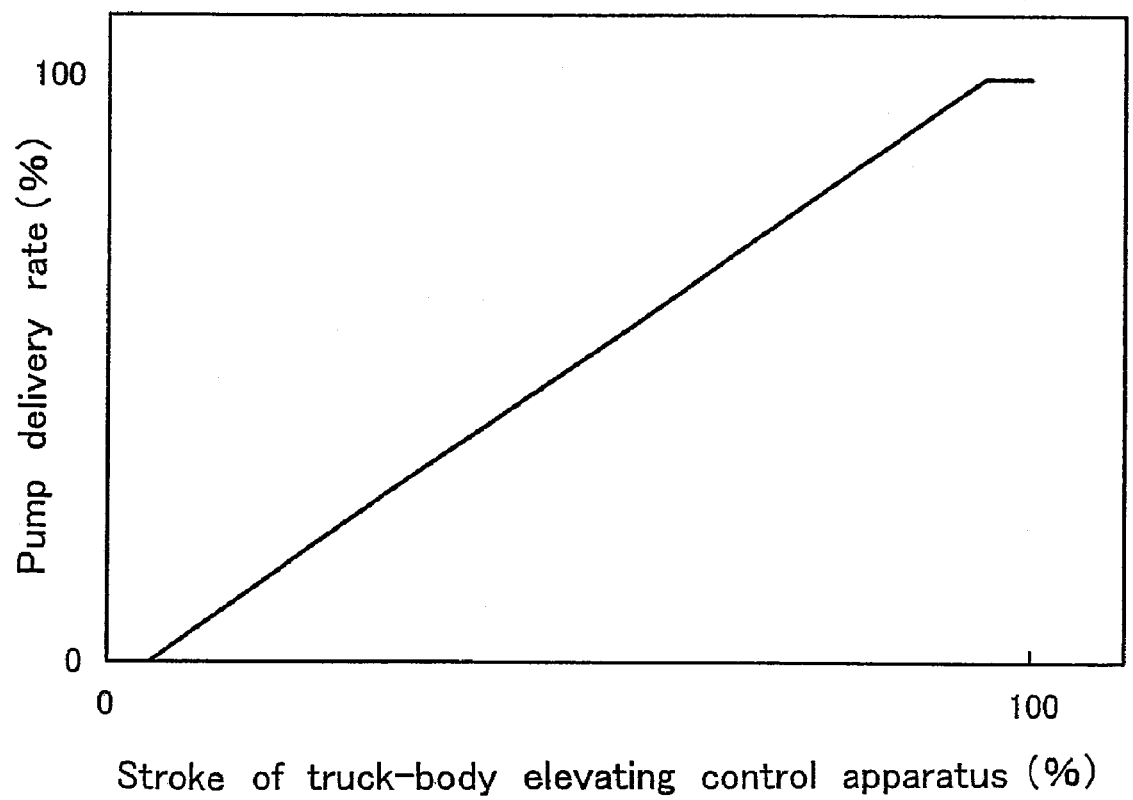
Figure 5:
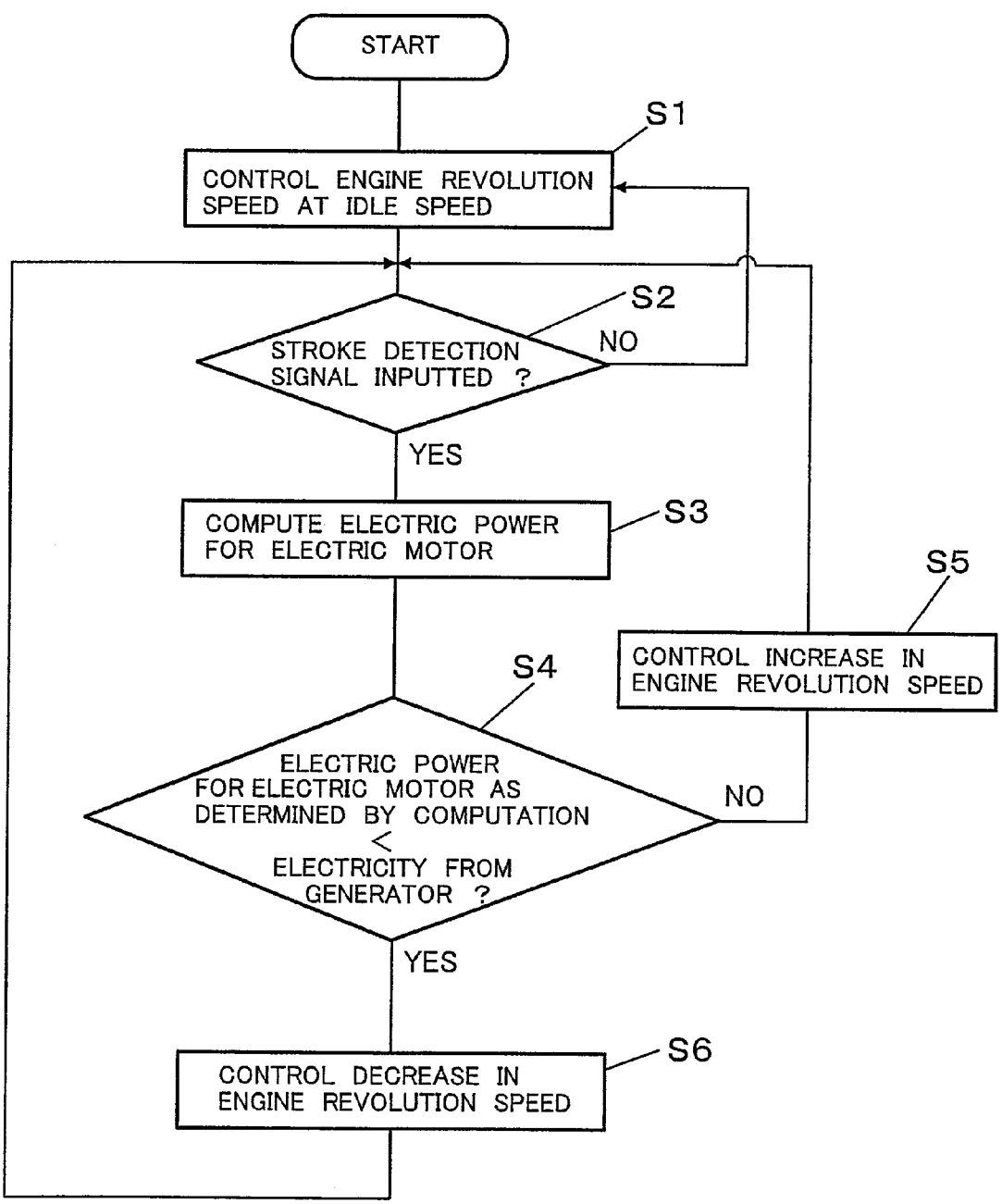

5 Truck body
6 Truck-body elevating cylinder
7 Engine
8 Generator
11 Electric motor
12a Hydraulic pump
12b Hydraulic pump
13 Truck-body elevating control valve
13 a Control lever
14 Stroke detector
19 Controller
19a Motor electric-power computing means
19b Discrimination means

The invention claimed is:

1. A hydraulic drive system for a dump truck having a truck frame and a truck body arranged pivotably in an up-and-down direction relative to said truck frame, said hydraulic drive system being to be mounted on said dump truck and being provided with an engine, a generator for outputting electricity corresponding to a rotation speed of said engine, an electric motor drivable responsive to said electricity from said generator, a hydraulic pump drivable by said electric motor, and truck-body elevating cylinders capable of being actuated by pressure oil delivered from said hydraulic pump to pivot said truck body in said up-and-down direction, comprising:
   a stroke detector for detecting a stroke of the control apparatus of said truck-body elevating cylinders; and
   a controller for controlling a rotation speed of said engine, said controller comprising a motor electric-power computing means for determining electric power for said electric motor, which corresponds to said stroke detected by said stroke detector, and a discrimination means for discriminating whether or not said electricity from said generator has become greater than said electric power for the electric motor as determined by said motor electric-power computing means.

2. The invention as defined in claim 1, wherein:
   a combination of said engine and said generator and a combination of said electric motor and said hydraulic pump are arranged apart from each other.

3. The invention as defined in claim 2, wherein:
   said controller comprises a means for performing processing to decreasingly control a rotation speed of said engine when said electricity from said generator is discriminated by said discrimination means to have become greater than the electric power for said motor as determined by said motor electric-power computing means.

4. The invention as defined in claim 1, wherein:
   said controller comprises a means for performing processing to decreasingly control a rotation speed of said engine when said electricity from said generator is discriminated by said discrimination means to have become greater than the electric power for said motor as determined by said motor electric-power computing means.

* * * * *